June 8, 1954
A. E. BRICKMAN
2,680,273
TERMINAL FITTING
Filed Nov. 12, 1948
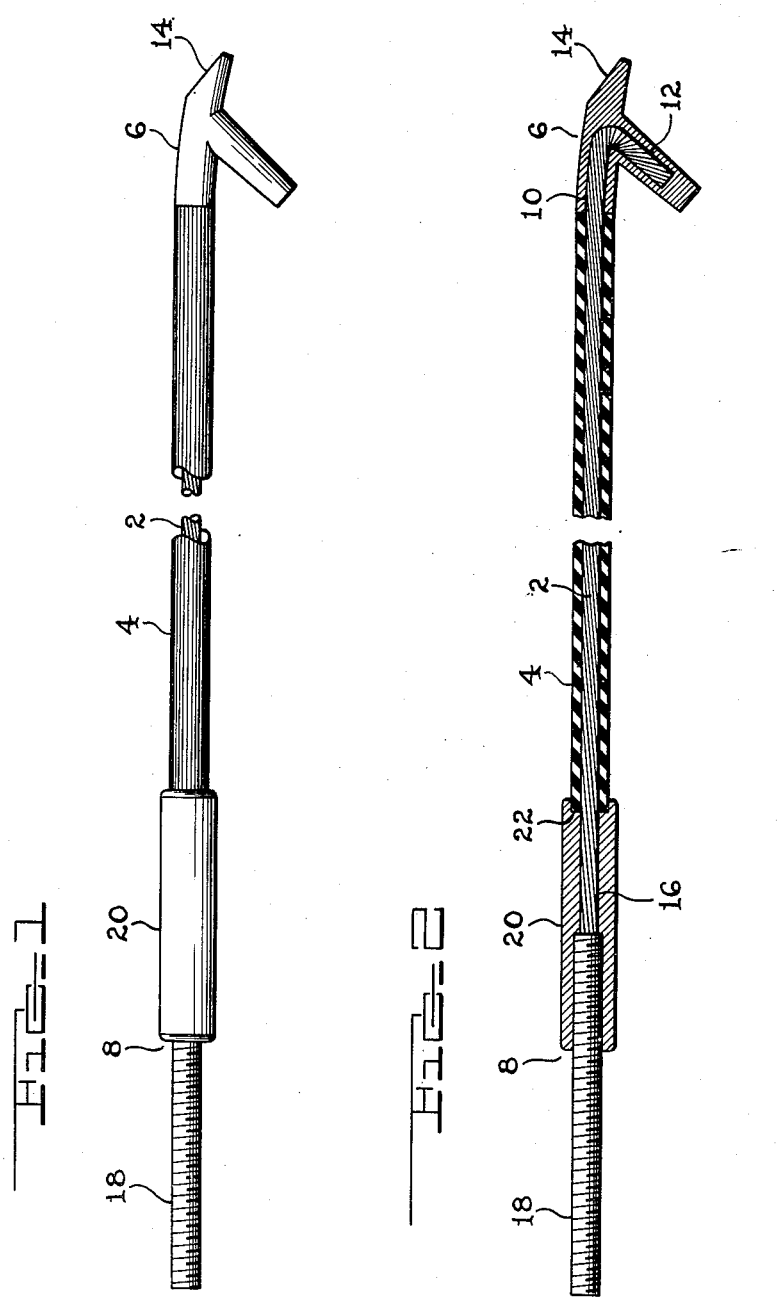
INVENTOR.
ALAN E. BRICKMAN
BY
Donald G. Dalton
ATTORNEY

Patented June 8, 1954

2,680,273

UNITED STATES PATENT OFFICE 2,680,273

TERMINAL FITTING

Alan E. Brickman, Worcester, Mass., assignor to United States Steel Corporation, a corporation of New Jersey Application November 12, 1948, Serial No. 59,436

2 Claims. (Cl. 24—73)

This invention relates to a terminal fitting and more particularly to such a fitting for use on stranded wire structures in harness cords. Harness cords are constructed of stranded wire structure covered with a rubber jacket and provided with two terminal fittings, one at each end thereof. Those in use are relatively expensive and it is therefore an object of my invention to provide a harness cord which is relatively inexpensive.

Another object is to provide a particular type of terminal fitting which is adapted for use in harness cords.

These and other objects will be more apparent after referring to the following specification and attached drawings, in which:

Figure 1 is a view of the harness cord of my invention; and

Figure 2 is a sectional view of the harness cord of Figure 1.

Referring more particularly to the drawings, the reference numeral 2 indicates a stranded wire structure having a jacket 4 thereon made of rubber or other thermoplastic. A hooked terminal fitting 6 is provided at one end and a threaded terminal fitting 8 is provided at the other end. In making the fitting 6 the rubber is removed from the end of the stranded wire structure at 10 and a return bend 12 is formed therein. In preparing the end the rubber is stripped from a longer length of wire than necessary and after the band has been provided therein, about one-half inch is cut off the end thereof. This permits better control of the bend since the elements of the stranded wire structure tend to separate in making the bend and the additional material permits the badly separated strands to be cut off. The hook fitting 6 is then die cast directly on the bared wire structure 10. A portion 14 extending beyond the wire structure is also provided in the fitting, the side thereof removed from the hook portion 12 being beveled as shown. The fitting 6 is attached to a wheel having a series of holes in its periphery extending inwardly at an angle to the radius. The hook portion fits into one of these holes with the portion 14 resting on the periphery of the wheel.

A fitting 8 is provided on the opposite end of the wire structure 2 in the following manner: The end 16 of the wire structure is stripped of rubber and a threaded rod 18 is placed in abutted relationship therewith within the cavity of a die. The fitting 20 is then die cast over the inner end of the threaded rod 18, the bared portion 16 of the stranded wire structure and a small portion 22 of the rubber jacket. The purpose of casting around the portion 22 is to prevent seepage of moisture into the stranded wire structure.

While one embodiment of my invention has been shown and described it will be apparent that other adaptations and modifications may be made without departing from the scope of the following claims.

I claim:

1. A harness cord comprising a stranded wire structure, a thermoplastic jacket thereon, said jacket terminating short of the ends of the stranded wire structure, one end of said stranded wire structure having a rearwardly extending bend therein, a cast fitting surrounding said bend, a portion of said fitting extending in line with the main portion of said stranded wire structure, a threaded rod abutting the other end of said stranded wire structure, and a cast fitting surrounding part of said rod, the bare portion of said stranded wire structure and the end of said jacket.

2. A harness cord comprising a stranded wire structure, a thermoplastic jacket thereon, said jacket terminating short of the ends of the stranded wire structure, one end of said stranded wire structure having a rearwardly extending bend therein, a cast fitting surrounding said bend, a portion of said fitting extending in line with the main portion of said stranded wire structure, the side of the extension removed from said bend being beveled, a threaded rod abutting the other end of said stranded wire structure, and a cast fitting surrounding part of said rod, the bare portion of said stranded wire structure and the end of said jacket.

References Cited in the file of this patent

UNITED STATES PATENTS

| Number | Name | Date |
|---|---|---|
| 1,642,314 | Stecke | Sept. 13, 1927 |
| 2,008,227 | Reilly | July 16, 1935 |
| 2,314,354 | Jefferson | Mar. 23, 1943 |
| 2,355,705 | Cohn | Aug. 15, 1944 |
| 2,565,375 | Lake | Aug. 21, 1951 |